United States Patent [19]
Davis

[11] Patent Number: 5,445,482
[45] Date of Patent: Aug. 29, 1995

[54] CARGO TIEDOWN

[76] Inventor: Jim B. Davis, 10350 56th St., Mira Loma, Calif. 91752

[21] Appl. No.: 154,085

[22] Filed: Nov. 18, 1993

Related U.S. Application Data

[63] Continuation-in-part of Ser. No. 76,760, Jun. 15, 1993, Pat. No. 5,302,064.

[51] Int. Cl.$^6$ .............................................. B60P 7/08
[52] U.S. Cl. .................................. 410/115; 410/101; 114/218
[58] Field of Search ............... 410/101, 106, 108-110, 410/112-115; 114/218; 24/265 CD, 115 K; 248/499, 503, 505; D8/356, 382

[56] References Cited

U.S. PATENT DOCUMENTS

| | | | |
|---|---|---|---|
| 2,759,432 | 8/1956 | Adler | 410/113 |
| 2,763,219 | 9/1956 | Adler | 24/265 CD |
| 2,786,428 | 3/1957 | Arnold . | |
| 2,857,855 | 10/1958 | Adler | 410/113 |
| 3,126,858 | 3/1964 | Rosinski | 114/218 |
| 3,357,670 | 12/1967 | Larson . | |
| 3,685,778 | 8/1972 | Berns . | |
| 3,713,616 | 1/1973 | Bowers . | |
| 3,796,917 | 11/1973 | Snyder et al. | 410/113 X |
| 4,319,537 | 4/1982 | Hackney | 114/218 X |
| 4,369,010 | 1/1983 | Ichinose . | |
| 4,592,686 | 6/1986 | Andrews . | |
| 4,630,990 | 12/1986 | Whiting . | |
| 4,850,769 | 7/1989 | Matthews . | |
| 4,850,770 | 7/1989 | Millar . | |
| 4,992,015 | 2/1991 | Florence . | |
| 5,302,064 | 4/1994 | Davis | 410/115 |

FOREIGN PATENT DOCUMENTS 654323 12/1962 Canada ................................. 410/113
2574724 6/1986 France .

Primary Examiner—Michael S. Huppert
Assistant Examiner—Stephen Gordon
Attorney, Agent, or Firm—Richard C. Litman

[57] ABSTRACT

A cargo tiedown permanently installable to the bed or floor of the cargo area of a pickup truck, trailer, or other vehicle, provides security for relatively thin, flat or narrow articles (e.g., sheet material, pipe, elongate extrusions, etc.) carried on the bed or floor. The tiedowns are preferably installed in pairs, on opposite sides of the floor or bed. The tiedown is monolithically formed of a series of base portions with tiedown loops or bridges extending therebetween. Each of the base portions include at least one fastener passage providing for securing the tiedown to the vehicle cargo floor. Each tiedown may include two or more tiedown loops or bridges, providing for the securing of a rope or other retainer laterally across the floor or bed. The base portions may be hollow, in order to save weight and material, and may include bosses extending through the hollow base portions for greater strength. The device is formed to eliminate sharp edges, in order to better protect any articles with which it might come in contact. Preferably, the fastener holes are countersunk for use with flat head screws, in order to eliminate any protrusion of screw heads from the upper surfaces of the base portions. The main body of the device may be formed of a variety of materials, such as aluminum or steel, either standard or stainless, or even plastic.

15 Claims, 2 Drawing Sheets

CARGO TIEDOWN

REFERENCE TO RELATED APPLICATION

This application is a continuation-in-part of U.S. patent application Ser. No. 08/076,760, filed on Jun. 15, 1993 and issued on Apr. 12, 1994 as U.S. Pat. No. 5,302,064.

FIELD OF THE INVENTION

The present invention relates generally to tiedowns and brackets for securing articles to another structure, and more specifically to a cargo tiedown installable in the bed or other area of a pickup truck, trailer, or other vehicle and providing secure anchorage for the securing of cargo within the vehicle.

BACKGROUND OF THE INVENTION

Various devices and means have been developed over the years for securing cargo or articles within a pickup box, trailer, or other types of vehicles. In fact, many trailers and pickups are equipped with stake pockets along the side walls of the box or other area, into which stakes or other securing devices may be installed.

The problem with these securing means is that they are all disposed well above the cargo bed of the vehicle, and any ropes or other securing devices tightly secured across the bed, remain well above the surface of the bed. Relatively lightweight sheets of material (e.g., foam insulation) may be readily picked up by the relative wind while in transit, and damaged or possibly even lifted sufficiently to slip between tiedown ropes across the top of the side walls and be blown out of the bed. Even in the case of relatively heavy sheets or other thin material (e.g., pipes and other elongate articles), the play allowed by tiedown means disposed across the top of the side walls, allows a great deal of movement of such cargo on the floor of the cargo area.

The need arises for a tiedown system which is easily and permanently installable to the floor or bed of a cargo area in a pickup, trailer, or other truck or vehicle. The tiedowns should provide for ropes or other ties to be secured directly adjacent or relatively close to the floor of the cargo area, thus limiting the vertical space for relatively thin articles to move within the cargo area. Moreover, the tiedowns should be relatively light and small, so as not to impinge significantly upon the area or volume otherwise available for cargo. Preferably, the tiedowns are formed as a plurality in a continuous length of monolithically formed material, to provide the strength and durability desired.

DESCRIPTION OF THE PRIOR ART

U.S. Pat. No. 2,786,428 issued to Garland Arnold on Mar. 26, 1957 discloses a Combination Cargo Tie Down and Seat Fitting. Each of the tiedown means includes only a single tiedown ring, and the tiedown base is mounted within the floor, rather than being attached directly thereover. The device also includes a multitude of parts, e.g., springs, slidable fittings and keepers, etc., which would be quite difficult to keep clear of dirt and debris. The overlying attachment of the present unitary, monolithic unit with its plural tiedown points comprises a significantly different structure than that of the Arnold tiedown.

U.S. Pat. No. 3,357,670 issued to Charles O. Larson on Dec. 12, 1967 discloses a Two-Way Spring Lock Hook providing for folding or retraction against the base portion. The hook itself is open, thereby requiring any tiedown installed thereto to be disposed in a direction opposite the open portion. Also, the unit provides only a single tiedown for each base mounting, and includes a plurality of movable parts. The closed tiedown loops or rings of the present invention provide security for a plurality of tiedowns arranged in any direction therefrom, unlike the Larson device.

U.S. Pat. No. 3,685,778 issued to Harald Berns on Aug. 22, 1972 discloses a Suspension Fitting For Cargo Safety Straps comprising a plurality of pieces insertable into a series of passages in the top of an inverted C shaped channel. Each of the passages includes a slot extending therefrom, providing for the insertion of the width of the tiedown loop member, as in a keyway. The tiedown loop member must be turned so as to misalign the member with the keyway; the strain on the tiedown is limited to directions other than that which would align the tiedown loop with the keyway. While Berns provides an additional keeper beneath the channel, this keeper must be welded to the tiedown loop before the channel is secured in place, thus making the installation and use of the Berns device excessively cumbersome in comparison to the present invention.

U.S. Pat. No. 3,713,616 issued to Thomas S. Bowers on Jan. 30, 1973 discloses a Load Holding Device Improvement comprising an upwardly facing C channel having a plurality of lateral slots therein, which slots engage one or more chocks having tiedown loops extending therefrom. Again, the device requires a plurality of separate parts to accomplish its function, and tiedown security is only provided so long as the tiedown is taut. If slack occurs, the tiedown may slip from its mating lateral slots, possibly slipping from the end of the C channel. The monolithic nature of the present invention precludes such slippage.

U.S. Pat. No. 4,369,010 issued to Hisao Tchinose et al. on Jan. 18, 1983 discloses a Reinforced Vehicle Frame And Tie Down Structure for use in the transport of vehicles. The apparatus comprises a conventional U-bolt welded to the vehicle structure, to which a tiedown may be installed to secure the vehicle while in transit during shipping. A bolt installed through the flange formed by the welded frame member to which the U-bolt is secured, provides additional strength in the area of the U-bolt to preclude the separation of the weld in that area due to forces on the U-bolt during transit. The U-bolt is welded directly to the vehicle, unlike the present invention, and is disposed parallel to the sheet member to which it is welded. No means is seen for the adaptation of the apparatus to serve the function of the present invention.

U.S. Pat. No. 4,592,686 issued to Gary E. Andrews on Jun. 3, 1986 discloses a Fastening Device including a U-bolt essentially installed to a trunnion fitting to allow for the swiveling or arcuate positioning of the U-bolt relative to two axes. While the device might be installable in the cargo bed of a vehicle, no means is seen to provide for the installation of plural units in a single apparatus, as provided by the present invention. Moreover, the device is relatively complex, with its multitude of separate components.

U.S. Pat. No. 4,630,990 issued to Montague Whiting on Dec. 23, 1986 discloses a Device And Method For Loading And Transporting Elongate Objects On The Tops Of Vehicles. The apparatus comprises a forward crossmember securable to the top of a vehicle, and a rear crossmember supported by an upright securable to the rear bumper and tailgate of a pickup truck. Accordingly, the apparatus does nothing to secure cargo within the bed of a pickup truck or other vehicle, and is considerably more complex than the unitary, monolithic structure of the present invention.

U.S. Pat. No. 4,850,770 issued to Henry E. Millar, Jr. on Jul. 25, 1989 discloses a Side Rail Tie-Down Anchor comprising a clamp securable to the upper edge or side rail of a pickup truck box side wall or the like. A hook providing for the securing of a tiedown rope thereto extends from the clamp. The device is not permanently attached, nor is it attachable to the bed of the truck box, as in the case of the present invention. The device also includes a plurality of separate components, unlike the present invention.

U.S. Pat. No. 4,850,770 issued to Henry E. Millar, Jr. on Jul. 25, 1989 discloses a Side Rail Tie-Down Anchor comprising plural components forming a clamp installable along the upper edge of a pickup box sidewall. Open hooks are disclosed, which could result in a tiedown line coming loose if it were to slip over the open end of the hook. The device also requires plural components, unlike the present invention.

U.S. Pat. No. 4,992,015 issued to Glen A. Florence on Feb. 12, 1992 discloses a Cargo Tie-Down Anchor comprising an essentially T-shaped section track and a cooperating fitting longitudinally slidable thereon. The fitting may be secured in a desired position by a threaded bolt having a retaining ring thereon. The height of the rail, the fitting thereon, and the tiedown ring extending upward therefrom, result in the tiedown being disposed at a significant height above the underlying surface to which the track is secured. Moreover, the requirement for plural parts in unlike the monolithic nature of the tiedown of the present invention, as noted above.

Finally, French Patent No. 2574-724 to Michel Dumas and published on Jun. 20, 1986 discloses a Vehicle Side Panel Load-Fixing Element comprising a strip of metal which is riveted into a specially formed groove in a truck bed sidewall. The sidewall element must be specially formed with a channel therein to accommodate any tiedown ropes or lines passing through the relatively thin, planar tiedown plate. The device is not adaptable to use in a pickup truck bed, due to the double wall construction required for the wall elements to which it is installed; the typical pickup truck box bed is formed of a single sheet of metal. To install the Dumas device in a pickup truck bed, one would have to cut a strip of metal out of the bed, thus destroying its structural integrity, downwardly offset the resulting edges of the bed to either side of the resulting gap in order to allow the upper surface of the tiedown plate to lie coplanar with the remainder of the bed surface, and rivet the plate in place. It is evident that the foregoing modification is not at all practicable, which Dumas makes clear by disclosing his tiedown as being adaptable only to a specially formed, double sided sidewall panel slat.

None of the above noted patents, taken either singly or in combination, are seen to disclose the specific arrangement of concepts disclosed by the present invention.

SUMMARY OF THE INVENTION

By the present invention, an improved cargo tiedown is disclosed.

Accordingly, one of the objects of the present invention is to provide an improved cargo tiedown which provides for the securing of cargo immediately adjacent the floor or bed of the cargo area of a pickup truck, trailer, or other vehicle.

Another of the objects of the present invention is to provide an improved cargo tiedown which is permanently installable to the cargo floor or bed.

Yet another of the objects of the present invention is to provide an improved cargo tiedown which may include plural tiedown means thereon.

Still another of the objects of the present invention is to provide an improved cargo tiedown which tiedown means is formed as a single, unitary and monolithic unit, with no additional parts or components other than the attachment fasteners or hardware.

An additional object of the present invention is to provide an improved cargo tiedown which eliminates any sharp protrusions or edges extending therefrom, thereby precluding possible injury to a user thereof or materials in contact therewith.

Yet another object of the present invention is to provide an improved cargo tiedown which may be formed of a variety of materials, including, but not limited to, aluminum, standard, or stainless steel.

Still another object of the present invention is to provide an improved cargo tiedown which tiedown loops are closed and disposed above the cargo area floor, with no intervening structure therebetween, and which may be secured by at least one anchor point to either end of each of the tiedown loops.

A further object of the present invention is to provide an improved cargo tiedown which may be forged to provide greater strength, if desired.

A final object of the present invention is to provide an improved cargo tiedown for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
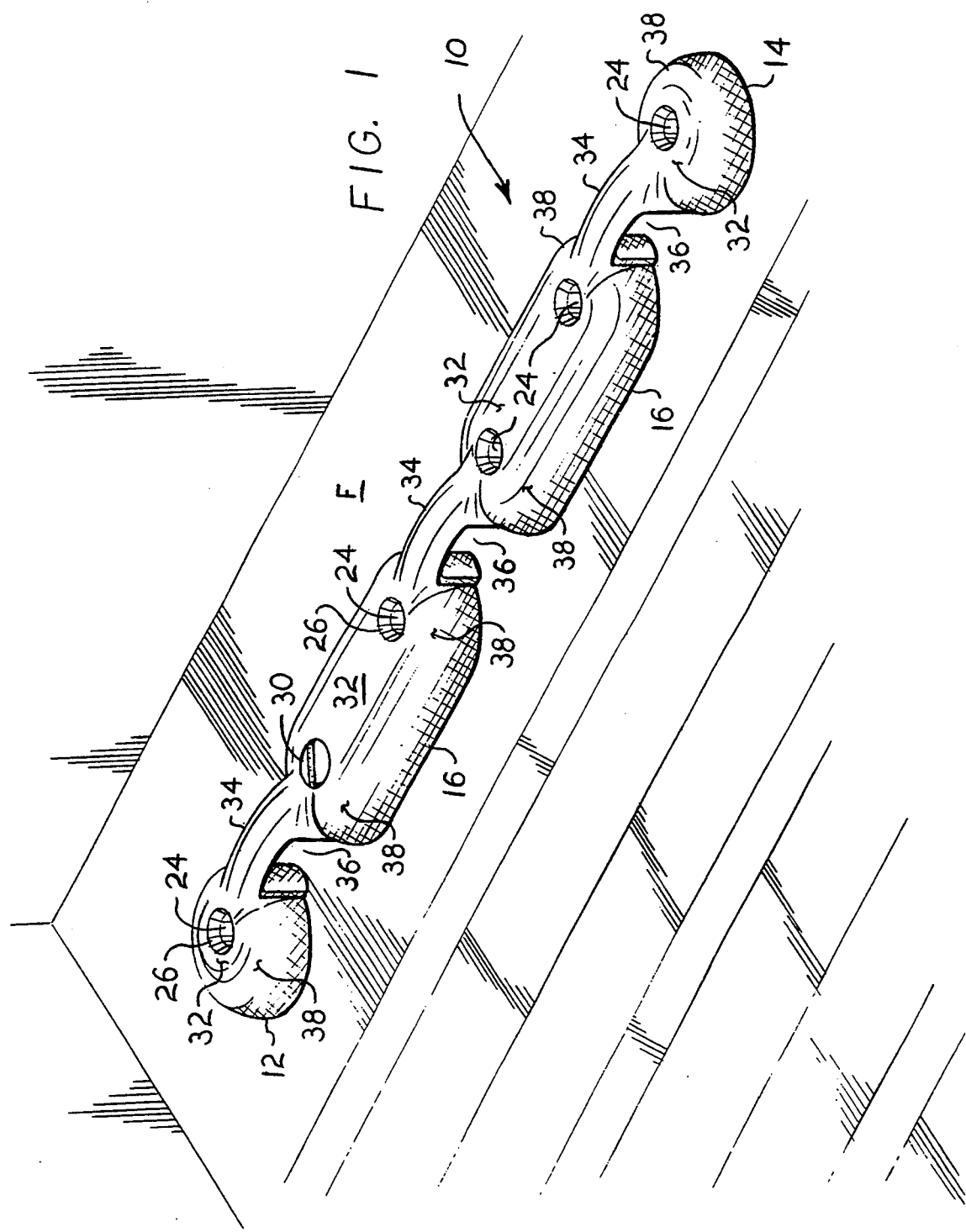
FIG. 1 is a perspective view of the present invention showing it in a typical installation, but with only a single attachment screw shown for clarity.

Referring now to the drawings, the present invention will be seen to relate to a cargo tiedown 10 for securing articles and material immediately adjacent the floor F or bed of a vehicle cargo area, as in a pickup truck, trailer, or other cargo carriage means. Cargo tiedown 10 includes a first base portion 12, an opposite and spaced apart second base portion 14, and a plurality of intermediate base portions 16 disposed linearly therebetween and spaced apart therefrom and from one another. Each of the first and second base portions 12 and 14 may be o any suitable planform, but are preferably circular in planform as shown in FIG. 1 in order to distribute evenly the attachment loads due to the attachment means disposed centrally therein. In a similar manner, each of the intermediate base portions 16 is preferably formed having an oval planform, with attachment means disposed at each end of each of the intermediate base portions 16.

Figure 2:
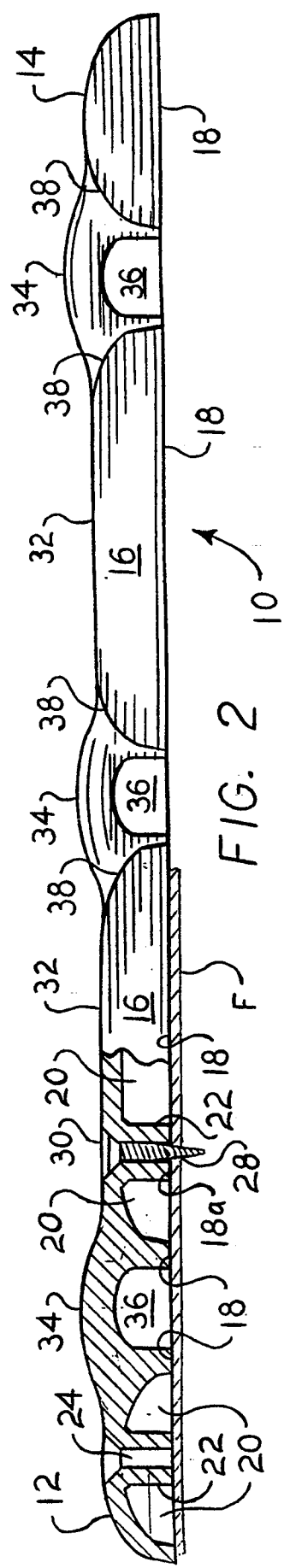
FIG. 2 is a broken side view in section along the central vertical plane of the present invention, showing further details of the present invention and attachment means.

The lower or attachment surfaces 18 (FIG. 2) of each of the base portions 12, 14 and 16 are coplanar, thereby providing an even and level bearing surface for the even distribution of attachment loads to a flat cargo floor F. A review of FIG. 2 also shows that the interior 20 of each of the base portions 12, 14 and 16 may be hollow, thereby reducing the weight of the tiedown 10. (The first base portion and a part of the adjacent intermediate base portion are shown broken away in FIG. 2 in order to show this feature clearly.) Extending through the hollow interior 20 of each of the base portions 12, 14 and 16 is at least one fastener boss 22 (FIG. 2). Each of these attachment bosses includes a lower or attachment edge or surface 18a, which surface 18a is also coplanar with the other lower or attachment surfaces 18 of the remainder of the tiedown 10, in order to support the compression loads developed in each of the base portions 12, 14 and 16 as they are secured to the underlying floor F. While the first and second base portions 12 and 14 include only a single central fastener boss 22 each, the relatively longer oval planform of the intermediate base portions 16 each provide for the inclusion of two fastener bosses 22 toward each end of each of the intermediate base portions 16. (One of these fastener bosses 22 in one of the intermediate portions 16 is shown in FIG. 2. It will be understood that each of the fastener holes 24 visible in FIG. 1 also includes a fastener boss 22 extending downward therefrom, within the hollow of the respective base portion.) such an arrangement will be seen to provide at least one attachment or anchor point at each end of the tiedown bridges extending between the base portions 12, 14 and 16, as discussed further below.

Each of the fastener holes 24 shown in FIGS. 1 and 2 will be seen to include a countersunk upper portion 26. Thus, the screws 28 or other fasteners used to secure the tiedown 10 to an underlying floor F or other structure, may be provided with flat heads to allow for flush mounting of the fastener heads 30 with the upper surface 32 of the base portions 12, 14 and 16. This provides additional advantages, as will be discussed below. The fasteners or screws 28 used to secure the cargo tiedown 10 to the underlying surface are preferably sheet metal screws, as depicted in FIG. 2, but alternatively other types of fasteners (e.g., machine screws or bolts and cooperating nuts beneath the floor F) may be used if desired.

Each of the spaced apart base portions 12, 14 and 16 includes a tiedown bridge 34 extending therebetween, i.e., the first base portion 12 and the next intermediate base portion 16 include a tiedown bridge 34 extending therebetween, each of the adjacent intermediate base portions 16 include a tiedown bridge 34 extending therebetween. Each of the tiedown bridges 34 comprises an elongate form, which lengths are disposed in alignment with the length of the cargo tiedown 10.

Each of the tiedown bridges 34 must be relatively strong, as any tiedown ropes or lines (not shown) will be secured directly about one or more of the tiedown bridges 34 to produce a stress concentration at that point. Accordingly, each of the tiedown bridges 34 is preferably a solid unit, without any hollows or discontinuities therein. Each of the tiedown bridges 34 spans a gap or opening 36 between the various adjacent base portions 12, 14 and 16, which gap or openings 36 provide for the passage of a tiedown rope or line (not Shown) therethrough. While not essential, preferably each of the tiedown bridges 34 is provided with a smooth, slightly arcuate form, in order to provide additional space 36 therebeneath for easier manipulation of any tiedown rope or line passed through the space or gap 36. As the adjacent base portions 12, 14 and 16 at each end of each tiedown bridge 34 is secured directly to the underlying cargo area floor F, it will be seen that no structure is required between each of the bridges 34 and the underlying floor F; each of the bridges 34 is separated from the floor F by only a space 36.

However, it is important to note that the tiedown bridges 34 do not extend excessively above the upper surfaces 32 of each of the base portions 12, 14 and 16. Also, it will be noted that each of the base portions 12, 14 and 16 includes smoothly rounded upper corners and edges 38. These rounded corners and edges 38, in combination with the slight arcuate configuration of the tiedown bridges 34, preclude any articles or cargo catching on a sharp corner or being scratched or otherwise damaged by contact with one of the cargo tiedowns 10. Such rounded corners and edges 38 also preclude injury to a person securing cargo or articles to the tiedown(s) 10, thus providing greater safety for such a person.

The cargo tiedown 10 of the present invention may be formed of a variety of materials, such as aluminum, standard steel, or even corrosion resistant ("stainless") steel if desired. Alternatively, a hard plastic (e.g., Nylon TM) might be used, depending upon the required durability and strength, although such a plastic material cargo tiedown 10 is preferably formed as a solid unit, rather than including the hollows 20 shown in FIG. 2. While it is not required that the tiedown 10 be formed of metal or other relatively hard material, such will preferably be the standard material used. In any case, the unitary, monolithic nature of cargo tiedown 10 provides for manufacturing techniques such as injection molding (for plastics), casting, or forging to be used. While preferably such tiedowns 10 are forged for maximum strength, in some instances less durable materials and manufacturing techniques may be suitable depending upon the intended use and environment.

Tiedown(s) 10 are preferably installed in pairs on the cargo floor F of a vehicle, such as the bed of a pickup truck box, trailer, etc., with each member of a pair being installed on a side of the floor F opposite the other pair member. One or more pairs may be installed as desired, by providing mounting holes in the floor F in the locations desired, and using sheet metal screws 28 and/or other fasteners to secure the base portions 12, 14 and 16 to the floor F. Flat, thin articles, e.g., pipe, angle iron, sheet material, etc., may then be secured immediately adjacent the floor F by means of rope(s), line(s) or strap(s) being secured laterally across the cargo between corresponding pairs of tiedown bridges 34 on opposite cargo tiedowns 10. The resulting arrangement of the tiedown rope(s), line(s) and/or strap(s) made taut immediately above the floor F of the cargo area, prevents the movement of narrow or flat, planar articles in the cargo area due to vehicle movement, acceleration, inertia, relative wind, etc., and serves to secure such articles properly for transport. The monolithic nature of the cargo tiedown 10, in combination with the closed loop of the tiedown bridges 34 when the tiedown 10 is secured to an underlying surface or floor F, precludes the disengagement of any tiedown rings or other multiple component mechanical apparatus in the event of a slack tiedown line or a cargo shift altering the force vector of the tiedown lines. Thus, the present invention provides a most effective and durable means of securing cargo or other articles to a vehicle floor or other applicable structure.

It is to be understood that the present invention is not limited to the sole embodiment described above, but encompasses any and all embodiments within the scope of the following claims.

I claim:

1. A cargo tiedown providing for permanent attachment to a floor in a cargo area of a vehicle, said cargo tiedown comprising:
   a unitary, monolithic unit including a first base portion, a second base portion, and at least one intermediate base portion between said first base portion and said second base portion;
   each said base portion being interconnected to at least one other said base portion by an elongate tiedown bridge extending therebetween, with each said base portion and each said tiedown bridge being disposed in a linear array;
   each said at least one intermediate base portion comprises a substantially oval planform having opposed ends, with one said tiedown bridge extending from said opposed ends of each said at least one intermediate base portion;
   each said at least one intermediate base portion includes two fastener holes therethrough, with one of said fastener holes respectively disposed adjacent each of said opposed ends thereof and adjacent each said tiedown bridge;
   each said base portion having a flat, planar lower surface, with each said base portion's lower surface being coplanar with another said base portion's lower surface to provide for mating attachment to a flat surface;
   each said base portion including at least one fastener hole therethrough providing for the attachment of said cargo tiedown to an underlying cargo floor;
   said first base portion and said second base portion each comprise a substantially round planform with one said fastener hole respectively disposed centrally through said first base portion and said second base portion; and
   each said tiedown bridge having an opening thereunder extending to each said lower surface of each said base portion, with each said opening comprising a cargo tiedown line passage means, whereby;
   said cargo tiedown may be permanently installed to the vehicle's cargo area floor and cargo may be secured immediately adjacent the cargo area floor by means of said tiedown bridges.

2. The cargo tiedown of claim 1 wherein:
each said at least one intermediate base portion includes two fastener holes therethrough.

3. The cargo tiedown apparatus of claim 1 including:
two of said at least one intermediate base portions disposed between said first base portion and said second base portion, thereby providing a total of four said base portions and a total of three said tiedown bridges extending therebetween.

4. The cargo tiedown of claim 1 wherein:
each said base portion includes smoothly rounded upper corners and edges, whereby potential damage is reduced to cargo, articles or persons coming in contact therewith.

5. The cargo tiedown of claim 1 including:
a screw disposed within each said fastener hole.

6. The cargo tiedown of claim 5 wherein:
each said screw is a sheet metal screw.

7. The cargo tiedown of claim 1 wherein:
each said base portion includes an upper surface and each said fastener hole includes a countersink within each said base portion upper surface.

8. The cargo tiedown of claim 7 including:
a flat head screw disposed within each said fastener hole, with each said flat head screw having a head lying substantially coplanar with said upper surface of each said base portion, whereby a smooth contour of said cargo tiedown is unbroken by screw heads protruding therefrom.

9. The cargo tiedown of claim 8 wherein:
each said flat head screw is a sheet metal screw.

10. The cargo tiedown of claim 1 wherein:
said cargo tiedown is formed of aluminum.

11. The cargo tiedown of claim 1 wherein:
said cargo tiedown is formed of steel.

12. The cargo tiedown of claim 1 wherein:
said cargo tiedown is formed of corrosion resistant steel.

13. The cargo tiedown of claim 1 wherein:
said cargo tiedown is formed of plastic.

14. A cargo tiedown providing for permanent attachment to a floor in a cargo area of a vehicle, said cargo tiedown comprising:
   a unitary, monolithic unit including a first base portion, a second base portion, and at least one intermediate base portion between said first base portion and said second base portion;
   each said base portion being interconnected to at least one other said base portion by an elongate tiedown bridge extending therebetween, with each said base portion and each said tiedown bridge being disposed in a linear array;
   each said at least one intermediate base portion comprises a substantially oval planform having opposed ends, with one said tiedown bridge extending from said opposed ends of each said at least one intermediate base portion;
   each said at least one intermediate base portion includes two fastener holes therethrough, with one of said fastener holes respectively disposed adjacent each of said opposed ends thereof and adjacent each said tiedown bridge;
   each said base portion having a flat, planar lower surface, with each said base portion's lower surface being coplanar with another said base portion's lower surface to provide for mating attachment to a flat surface;
   each said base portion including at least one fastener hole therethrough providing for the attachment of said cargo tiedown to an underlying cargo floor;
   each said base portion includes a hollow interior which further includes at least one fastener boss extending therethrough, with each said fastener boss having a flat, planar lower surface coplanar with each said base portion's lower surface, and each said fastener boss including said at least one fastener hole therethrough, whereby;

each said fastener boss provides compressive strength for each said hollow base portion when said cargo tiedown is secured to an underlying vehicle's cargo floor by means of a fastener through each said at least one fastener hole and each said fastener boss; and each said tiedown bridge having an opening thereunder extending to each said lower surface of each said base portion, with each said opening comprising a cargo tiedown line passage means, whereby;

said cargo tiedown may be permanently installed to the vehicle's cargo area floor and cargo may be secured immediately adjacent the cargo area floor by means of said tiedown bridges.

15. A cargo tiedown providing for permanent attachment to a floor in a cargo area of a vehicle, said cargo tiedown comprising:

a unitary, monolithic unit including a first base portion, a second base portion, and at least one intermediate base portion between said first base portion and said second base portion;

each said base portion being interconnected to at least one other said base portion by an elongate tiedown bridge extending therebetween, with each said base portion and each said tiedown bridge being disposed in a linear array;

each said at least one intermediate base portion comprises a substantially oval planform having opposed ends, with one said tiedown bridge extending from said opposed ends of each said at least one intermediate base portion;

each said at least one intermediate base portion includes two fastener holes therethrough, with one of said fastener holes respectively disposed adjacent each of said opposed ends thereof and adjacent each said tiedown bridge;

each said base portion having a flat, planar lower surface, with each said base portion's lower surface being coplanar with another said base portion's lower surface to provide for mating attachment to a flat surface;

each said base portion including at least one fastener hole therethrough providing for the attachment of said cargo tiedown to an underlying cargo floor;

each said tiedown bridge having an opening thereunder extending to each said lower surface of each said base portion, with each said opening comprising a cargo tiedown line passage means; and each said tiedown bridge comprises a smooth and arcuate form, whereby additional space is provided within each said opening therebeneath whereby;

said cargo tiedown may be permanently installed to the vehicle's cargo area floor and cargo may be secured immediately adjacent the cargo area floor by means of said tiedown bridges.

* * * * *